United States Patent
Takahashi (10) Patent No.: US 11,424,461 B2
(45) Date of Patent: Aug. 23, 2022

(54) FUEL CELL SYSTEM AND VEHICLE

(71) Applicant: TOYOTA JIDOSHA KABUSHIKI KAISHA, Toyota (JP)

(72) Inventor: Yasushi Takahashi, Mishima (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 77 days.

(21) Appl. No.: 17/119,078

(22) Filed: Dec. 11, 2020

(65) Prior Publication Data
US 2021/0226234 A1    Jul. 22, 2021

(30) Foreign Application Priority Data

Jan. 16, 2020    (JP) .............................. JP2020-005248

(51) Int. Cl.
*H01M 8/04* (2016.01)
*H01M 8/04119* (2016.01)
*H01M 8/04746* (2016.01)

(52) U.S. Cl.
CPC ... *H01M 8/04164* (2013.01); *H01M 8/04753* (2013.01); *H01M 2250/20* (2013.01)

(58) Field of Classification Search
CPC ......... H01M 8/04164; H01M 8/04753; H01M 2250/20
USPC ........................................................ 429/414
See application file for complete search history.

(56) References Cited

U.S. PATENT DOCUMENTS

| | | | |
|---|---|---|---|
| 2008/0088273 A1* | 4/2008 | Shu | H01M 8/04776 |
| | | | 429/444 |
| 2018/0097246 A1* | 4/2018 | Meder | H01M 8/04089 |
| 2018/0351184 A1 | 12/2018 | Fukatsu | |
| 2019/0173113 A1* | 6/2019 | Ono | H01M 8/04723 |
| 2019/0363375 A1* | 11/2019 | Hosoi | H01M 8/04164 |

FOREIGN PATENT DOCUMENTS

| | | |
|---|---|---|
| JP | 2009-037870 A | 2/2009 |
| JP | 2011-170978 A | 9/2011 |
| JP | 2017-174753 A | 9/2017 |

* cited by examiner

*Primary Examiner* — James M Erwin
(74) *Attorney, Agent, or Firm* — Finnegan, Henderson, Farabow, Garrett & Dunner, LLP (57) ABSTRACT

To make it possible to suppress the occurrence of white fog and water splashing in a fuel cell system and to discharge gas and liquid to the outside of the system while diluting fuel gas, a fuel cell system is provided wherein each of an anode off-gas passage and a cathode off-gas passage is provided with a gas-liquid separator, an exhaust passage and a drain passage are separated, a gas in the anode off-gas is mixed with a gas in the cathode off-gas and are discharged together, and a liquid in the anode off-gas is mixed with a liquid in the cathode off-gas and are discharged together. The liquid surface level of the gas-liquid separator provided in the anode off-gas passage is controlled by a controller so that the liquid surface level does not become zero when liquid is discharged. As a result, in the gas-liquid separator, it is possible to prevent the gas in the anode off-gas from flowing into the drain side. Thus, the occurrence of white fog or water splashing can be suppressed by separately providing the exhaust system and the drain system. Additionally, it is possible to dilute the fuel gas by mixing the anode exhaust gas with the cathode exhaust gas in the exhaust system.

6 Claims, 3 Drawing Sheets

FUEL CELL SYSTEM AND VEHICLE

FIELD

The present application discloses a fuel cell system and a vehicle.

BACKGROUND

When electricity is generated by a fuel cell, water is discharged from the fuel cell to the outside of the system. When discharging water from the fuel cell to the outside of the system, the occurrence of white fog may be of a problem. White fog may occur in the following cases by way of example. Namely, when water which is collected in a gas-liquid separator provided in an anode off-gas passage is mixed in a cathode off-gas passage, the water is vaporized by a high temperature cathode off-gas, and when the vaporized water is discharged to the outside of the system from the cathode off-gas passage, the vaporized water is cooled by external temperature and changes into a white fog-like state.

In the technology disclosed in Patent Literature 1, an anode off-gas discharged from a fuel cell is separated into gas and liquid by a gas-liquid separator, and the liquid is carried by a cathode off-gas and discharged to the outside. When it is judged that white fog will occur when the cathode off-gas is discharged to the outside, the flow amount or flow rate of the cathode off-gas is controlled. As a result, it is possible to suppress the occurrence of white fog.

Note that technologies in which the off-gas from a fuel cell is separated by a gas-liquid separator into gas and liquid are also disclosed in Patent Literature 2 and 3.

CITATION LIST

Patent Literature

[PTL 1] Japanese Unexamined Patent Publication No. 2009-037870
[PTL 2] Japanese Unexamined Patent Publication No. 2011-170978
[PTL 3] Japanese Unexamined Patent Publication No. 2017-174753

SUMMARY

Technical Problem

In the technology disclosed in Patent Literature 1, water in an anode off-gas is mixed with a cathode off-gas to thereby dilute all of the water discharged from a fuel cell by the cathode off-gas. However, since there are cases where the flow amount of the cathode off-gas changes depending on the operation state of the fuel cell, the water may not be appropriately diluted by the cathode off-gas. Furthermore, if the flow amount of the cathode off-gas is increased for dilution, the total volume of gas increases, and accordingly, it is considered that though the white fog itself becomes thin, the fuel economy may decrease.

When water is discharged from the fuel cell to the outside of the system, it is desirable to not only suppress the occurrence of the aforementioned white fog but also suppress spraying (splashing) of water around the fuel cell. Water splashing becomes problematic, for example, when the fuel cell is mounted on a vehicle. In other words, when water is discharged from the fuel cell during movement of the vehicle, it is necessary to prevent water from splashing subsequent vehicles if at all possible. In the technology disclosed in Patent Literature 1, as stated above, the water is discharged to the outside of the system along with the cathode off-gas, and accordingly, is sprayed together with the cathode off-gas, and thus the problem of water splashing tends to occur.

In addition, the anode off-gas of the fuel cell may contain fuel gas in addition to the aforementioned water. When the fuel gas is discharged to the outside of the system, it is desirable to dilute the fuel gas as much as possible.

Solution to Problem

The present application discloses, as one of means for solving the aforementioned problems, a fuel cell system comprising:

a fuel cell;
a first flow passage through which an anode off-gas is discharged from the fuel cell;
a second flow passage through which a cathode off-gas is discharged from the fuel cell;
an anode gas-liquid separator which is connected to the first flow passage and which separates the anode off-gas into a separated anode gas and a separated anode liquid;
a cathode gas-liquid separator which is connected to the second flow passage and which separates the cathode off-gas into a separated cathode gas and a separated cathode liquid;
a third flow passage through which the separated anode gas is discharged from the anode gas-liquid separator, a fourth flow passage through which the separated anode liquid is discharge from the anode gas-liquid separator;
a fifth flow passage through which the separated cathode gas is discharged from the cathode gas-liquid separator;
a sixth flow passage through which the separated cathode liquid is discharge from the cathode gas-liquid separator;
a first connection portion where the third flow passage and the fifth flow passage are connected to each other and the separated anode gas and the separated cathode gas are mixed;
a seventh flow passage through which the mixed separated anode gas and separated cathode gas are discharged from the first connection portion;
a second connection portion where the fourth flow passage and the sixth flow passage are connected to each other and the separated anode liquid and the separated cathode liquid are mixed;
an eighth flow passage through which the mixed separated anode liquid and separated cathode liquid are discharged from the second connection portion; and
a controller which controls a liquid surface level of the anode gas-liquid separator, wherein
the separated anode liquid is discharged from a lower portion of the anode gas-liquid separator, and
the controller controls the liquid surface level of the anode gas-liquid separator so that the liquid surface level does not become zero when the separated anode liquid is discharged from the anode gas-liquid separator.

In the fuel cell system of the present disclosure, the anode gas-liquid separator may comprise a liquid surface level sensor.

In the fuel cell system of the present disclosure, the anode off-gas may contain hydrogen.

In the fuel cell system of the present disclosure, the fuel cell may be a polymer electrolyte fuel cell.

The present application discloses, as one of means for solving the aforementioned problem, a vehicle comprising the fuel cell system of the present disclosure.

In the vehicle of the present disclosure, a drain port of the fuel cell system may be oriented downward in a central portion of the vehicle in the width direction.

Advantageous Effects

In the fuel cell of the present disclosure, the separated anode gas contained in the anode off-gas is mixed with the separated cathode gas contained in the cathode off-gas and is discharged together to the outside of the system, and the separated anode liquid contained in the anode off-gas is mixed with the separated cathode liquid contained in the cathode off-gas and is discharged together to the outside of the system. Furthermore, the mixing of the separated anode gas into a drainage system can be prevented by controlling the liquid surface level of the anode gas-liquid separator. Thus, in the fuel cell system of the present disclosure, since the exhaust system and the drainage system are separately provided, the aforementioned white fog and water splashing tend not to occur. Moreover, in the fuel cell system of the present disclosure, it is possible to dilute the fuel gas in the separated anode gas by mixing the separated anode gas with the separated cathode gas.

DESCRIPTION OF EMBODIMENTS

1. Fuel Cell System

Figure 1:
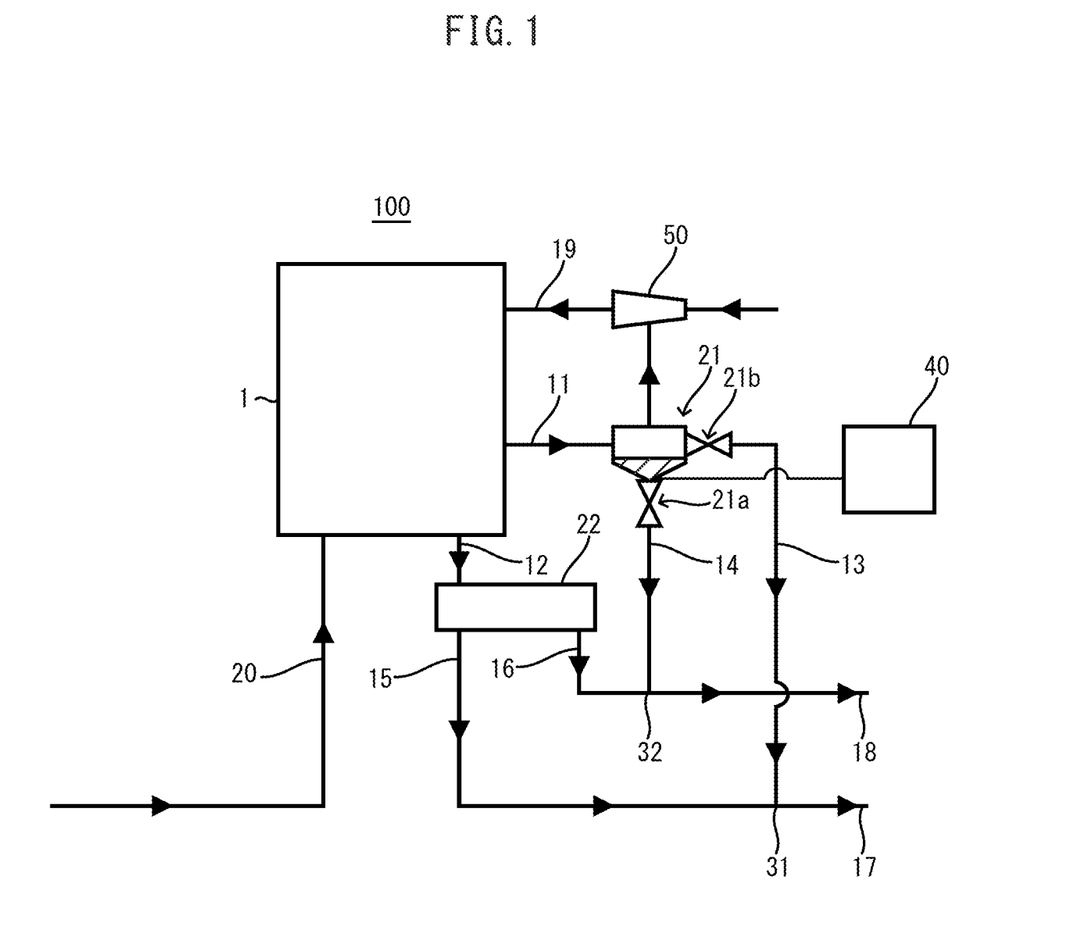
FIG. 1 is a schematic explanatory view of the structure of the fuel cell system 100.

FIG. 1 schematically illustrates the structure of the fuel cell system 100. As shown in FIG. 1, the fuel cell system 100 comprises:

a fuel cell 1, a first flow passage 11 through which an anode off-gas is discharged from the fuel cell 1, a second flow passage 12 through which a cathode off-gas is discharged from the fuel cell 1, an anode gas-liquid separator 21 which is connected to the first flow passage 11 and which separates the anode off-gas into a separated anode gas and a separated anode liquid, a cathode gas-liquid separator 22 which is connected to the second flow passage 12 and which separates the cathode off-gas into a separated cathode gas and a separated cathode liquid, a third flow passage 13 through which the separated anode gas is discharged from the anode gas-liquid separator 21, a fourth flow passage 14 through which the separated anode liquid is discharge from the anode gas-liquid separator 21, a fifth flow passage 15 through which the separated cathode gas is discharged from the cathode gas-liquid separator 22, a sixth flow passage 16 through which the separated cathode liquid is discharge from the cathode gas-liquid separator 22, a first connection portion 31 where the third flow passage 13 and the fifth flow passage 15 are connected to each other and the separated anode gas and the separated cathode gas are mixed, a seventh flow passage 17 through which the mixed separated anode gas and separated cathode gas are discharged from the first connection portion 31, a second connection portion 32 where the fourth flow passage 14 and the sixth flow passage 16 are connected to each other and the separated anode liquid and the separated cathode liquid are mixed, an eighth flow passage 18 through which the mixed separated anode liquid and separated cathode liquid are discharged from the second connection portion 32, and a controller 40 which controls the liquid surface level of the anode gas-liquid separator 21.

The separated anode liquid is discharged from a lower portion of the anode gas-liquid separator 21.

The controller 40 controls the liquid surface level of the anode gas-liquid separator 21 so that the liquid surface level does not become zero when the separated anode liquid is discharged from the anode gas-liquid separator 21.

1.1 Fuel Cell

The fuel cell 1 is supplied with cathode gas and anode gas to generate electricity. The cathode gas may be an oxygen-containing gas, such as air. The anode gas may be hydrogen or may be a fuel gas other than hydrogen. By way of example, the fuel cell 1 may be a polymer electrolyte fuel cell (PEFC). In general, PEFCs have a low operating temperature, and accordingly, it is considered that the aforementioned problems of white fog and water splashing tend to occur. However, according to the fuel cell system 100 of the present disclosure, the white fog and water splashing can be suppressed. The fuel cell 1 may be a stack of fuel cells. The connection method of the fuel cell 1 and the flow passages, which will be discussed hereinafter, is not particularly limited. For example, connection using conventional piping systems may be used.

1.2 First Flow Passage

The anode off-gas is discharged from the fuel cell 1 into the first flow passage 11. The first flow passage 11 is connected to the anode gas-liquid separator 21. In other words, the first flow passage 11 defines a passage through which the anode off-gas discharged from the fuel cell 1 is guided to the anode gas-liquid separator 21. For instance, one end of the first flow passage 11 on the upstream side may be connected to the anode off-gas discharge port of the fuel cell 1, and the other end on the downstream side may be connected to the anode gas-liquid separator 21. The anode off-gas may contain, for example, hydrogen as mentioned above. In the fuel cell system 100 of the present disclosure, if the anode off-gas contains hydrogen, the anode off-gas can be discharged with diluted hydrogen. Alternatively, the anode off-gas may contain a fuel gas other than hydrogen. Furthermore, the anode off-gas may contain water.

1.3 Second Flow Passage

The cathode off-gas is discharged from the fuel cell 1 into the second flow passage 12. The second flow passage 12 is connected to the cathode gas-liquid separator 22. In other words, the second flow passage 12 defines a passage through which the cathode off-gas discharged from the fuel cell 1 is guided to the cathode gas-liquid separator 22. For example, one end of the second flow passage 12 on the upstream side may be connected to the cathode off-gas discharge port of the fuel cell 1, and the other end on the downstream side may be connected to the cathode gas-liquid separator 22. The cathode off-gas may contain, for example, oxygen and/or water.

1.4 Third Flow Passage

The separated anode gas is discharged from the anode gas-liquid separator 21 into the third flow passage 13. The third flow passage 13 is connected to the fifth flow passage 15 at the first connection portion 31 to mix the separated anode gas and the separated cathode gas. In other words, the third flow passage 13 defines a passage through which the separated anode gas discharged from the anode gas-liquid separator 21 is guided to the fifth flow passage 15, which is the discharge passage of the separated cathode gas. For instance, one end of the third flow passage 13 on the upstream side may be connected to an exhaust valve 21b provided in the anode gas-liquid separator 21, and the other end on the downstream side may be connected to the first connection portion 31.

The separated anode gas may contain, for example, hydrogen or a fuel gas other than hydrogen.

The separated anode gas may contain water, but the amount of water is reduced compared to the anode off-gas, and accordingly, the problems of white fog and water splashing tend not to occur.

1.5 Fourth Flow Passage

The separated anode liquid is discharged from the anode gas-liquid separator 21 into the fourth flow passage 14. The fourth flow passage 14 is connected to the sixth flow passage 16 at a second connection portion 32 to mix the separated anode liquid and the separated cathode liquid. In other words, the fourth flow passage 14 defines a passage through which the separated anode liquid discharged from the anode gas-liquid separator 21 is guided to the sixth flow passage 16, which is the discharge passage of the separated cathode liquid. For instance, one end of the fourth flow passage 14 on the upstream side may be connected to a drain valve 21a provided in the anode gas-liquid separator 21, and the other end on the downstream side may be connected to the second connection portion 32. The separated anode liquid may contain, for example, water. Note that in the fuel cell system 100, as described hereinafter, it is possible to prevent the separated anode gas from flowing into the fourth flow passage 14 together with the separated anode liquid by controlling the liquid surface level with the controller 40. In other words, in the fuel cell system 100 of the present disclosure, substantially only the separated anode liquid flows in the fourth flow passage 14.

1.6 Fifth Flow Passage

The separated cathode gas is discharged from the cathode gas-liquid separator 22 into the fifth flow passage 15. Furthermore, as mentioned above, the third flow passage 13 and the fifth flow passage 15 are connected to each other at the first connection portion 31 to mix the separated anode gas and the separated cathode gas. As a result, the separated anode gas discharged from the anode gas-liquid separator 21 can be diluted with the separated cathode gas discharged from the cathode gas-liquid separator 22 and discharged to the outside of the system. For example, one end of the fifth flow passage 15 on the upstream side may be connected to an exhaust valve (not shown) provided in the cathode gas-liquid separator 22, the other end on the downstream side of the fifth flow passage 15 may be provided with the first connection portion 31 at which the fifth flow passage 15 is connected to the third flow passage 13, the seventh flow passage 17 may be provided on the downstream side of the first connection portion 31, and the downstream side of the seventh flow passage 17 may open to the outside of the system. The separated cathode gas may contain, for example, oxygen. The separated cathode gas may contain water, but the amount of water is reduced compared to the cathode off-gas, and accordingly, the problems of white fog and water splashing tend not to occur.

1.7 Sixth Flow Passage

The separated cathode liquid is discharged from the cathode gas-liquid separator 22 into the sixth flow passage 16. As mentioned above, the fourth flow passage 14 and the sixth flow passage 16 are connected to each other at the second connection portion 32 to mix the anode separation liquid and the separated cathode liquid. Thus, the separated anode liquid discharged from the anode gas-liquid separator 21 can be discharged together with the separated cathode liquid discharged from the cathode gas-liquid separator 22 to the outside of the system. For example, one end of the sixth flow passage 16 on the upstream side may be connected to a drain valve (not shown) provided in the cathode gas-liquid separator 22, the other end on the downstream side of the sixth flow passage 16 may be provided with the second connection portion 32 at which the sixth flow passage 16 is connected to the fourth flow passage 14, the eighth flow passage 18 may be provided on the downstream side of the second connection portion 32, and the downstream side of the eighth flow passage 18 may open to the outside of the system. The separated cathode liquid may contain, for example, water. The separated cathode liquid may contain a gas such as oxygen mixed therewith.

1.8 Seventh Flow Passage and Eighth Flow Passage

As stated above, the seventh flow passage 17 is provided on the downstream side of the first connection portion 13 and the eighth flow passage 18 is provided on the downstream side of the second connection portion 32. The mixed separated anode gas and separated cathode gas are discharged from the first connection portion 31 into the seventh flow passage 17. The mixed separated anode liquid and separated cathode liquid are discharged from the second connection portion 32 into the eighth flow passage 18.

1.9 First Connection Portion and Second Connection Portion

The connection method of the flow passages at the first connection portion 31 and the second connection portion 32 is not particularly limited to a specific method. For example, conventional piping connections may be used.

1.10 Anode Gas-Liquid Separator

The anode gas-liquid separator 21 is connected to the first flow passage 11 and separates the anode off-gas into the separated anode gas and the separated anode liquid. The anode gas-liquid separator 21 discharges the separated anode liquid from the lower portion thereof.

In the present invention, the position of "the lower portion" of the anode gas-liquid separator 21 substantially corresponds to a position where the liquid surface level of the anode gas-liquid separator 21 is zero. Namely, when the liquid surface level in the anode gas-liquid separator 21 is above zero, at least the lower portion of the anode gas-liquid separator 21 is filled with the separated anode liquid. In other words, as long as the liquid surface level in the anode gas-liquid separator 21 is above zero, the separated anode liquid functions as a barrier between the anode gas-liquid separator 21 and the fourth flow passage 14, whereby it is unlikely that the separated anode gas will flow into the fourth flow passage 14.

As shown in FIG. 1, the anode gas-liquid separator 21 is provided with a drain port at the lower portion thereof, and the drain port may be opened and closed by a drain valve 21a. Furthermore, the anode gas-liquid separator 21 may have an exhaust port in a portion other than the lower portion, and the exhaust port may be opened and closed by an exhaust valve 21*b*. The drain valve 21*a* of the anode gas-liquid separator 21 is provided in the lower portion of the anode gas-liquid separator 21, as mentioned above. On the other hand, the position of the exhaust valve 21*b* of the anode gas-liquid separator 21 is not limited to a specific position, and the exhaust valve 21*b* may be located at any position as long as it is above the drain valve 21*a* provided in the lower portion. If it is assumed that the internal space of the anode gas-liquid separator 21 is divided into an upper half and a lower half, the exhaust valve 21*b* may be provided in the upper half and the drain valve 21*a* may be provided in the lower half. The anode gas-liquid separator 21 may have the same structure as the gas-liquid separator disclosed in PTL 2. Note that in order to circulate and reuse hydrogen contained in the separated anode gas, the anode gas-liquid separator 21 may be provided with a hydrogen discharge passway, the downstream side of which is connected to an injector 50.

1.11 Cathode Gas-Liquid Separator

The cathode gas-liquid separator 22 is not limited to a specific form as long as it can separate gas and liquid. Any type of well-known gas-liquid separator can be used as the cathode gas-liquid separator 22. From the viewpoint of prevention of separated cathode gas from flowing into the fifth flow passage 15, a cathode gas-liquid separator 22 having the same structure as the anode gas-liquid separator 21 may be adopted. Furthermore, in the cathode gas-liquid separator 22, the liquid surface level may be controlled with the controller 40.

1.12 Controller

The controller 40 controls the liquid surface level of the anode gas-liquid separator 21 so that the liquid surface level does not become zero when the separated anode liquid is discharged from the anode gas-liquid separator 21. The controller 40 may be configured in the same way as conventional control means. In other words, the controller 40 may comprise a CPU, RAM and ROM, etc.

As stated above, when the separated anode liquid is discharged from the anode gas-liquid separator 21, the separated anode liquid fills between the anode gas-liquid separator 21 and the fourth flow passage 14 by maintaining the internal liquid surface level of the anode gas-liquid separator 21 above zero. As a result, it is possible to prevent the separated anode gas from flowing into the fourth flow passage 14, whereby the exhaust system and the drain system on the anode side can be more clearly separated.

The control operation of the controller 40 is not limited to a specific operation. For example, the anode gas-liquid separator 21 may comprise a liquid surface level sensor, wherein when the drain valve 21*a* of the anode gas-liquid separator 21 is opened to discharge the separated anode liquid, a change of the liquid surface level of the anode gas-liquid separator 21 may be monitored by the liquid surface level sensor and information regarding the liquid surface level obtained by the liquid surface level sensor may be transmitted to the controller 40. In this case, the controller 40 may judge whether the liquid surface level obtained by the liquid surface level sensor is above a threshold value. If the liquid surface level is above the threshold value, the controller 40 may control the drain valve 21*a* to maintain in an open state, so that the drainage of the liquid into the fourth flow passage 14 continues. In contrast, if the liquid surface level obtained by the liquid surface level sensor is below the threshold value, the controller 40 may control the drain valve 21*a* to close to stop the discharging of the separated anode liquid. As a result, when the separated anode liquid is discharged from the anode gas-liquid separator 21, it is possible to maintain the liquid surface level of the anode gas-liquid separator 21 above zero. Alternatively, it may be possible to indirectly control the liquid surface level without using a liquid surface level sensor.

1.13 Other Constituent Components

The fuel cell system 100 may comprise the following structures in addition to the aforementioned structures.

1.13.1 Anode Gas Supply Passage

Figure 2:
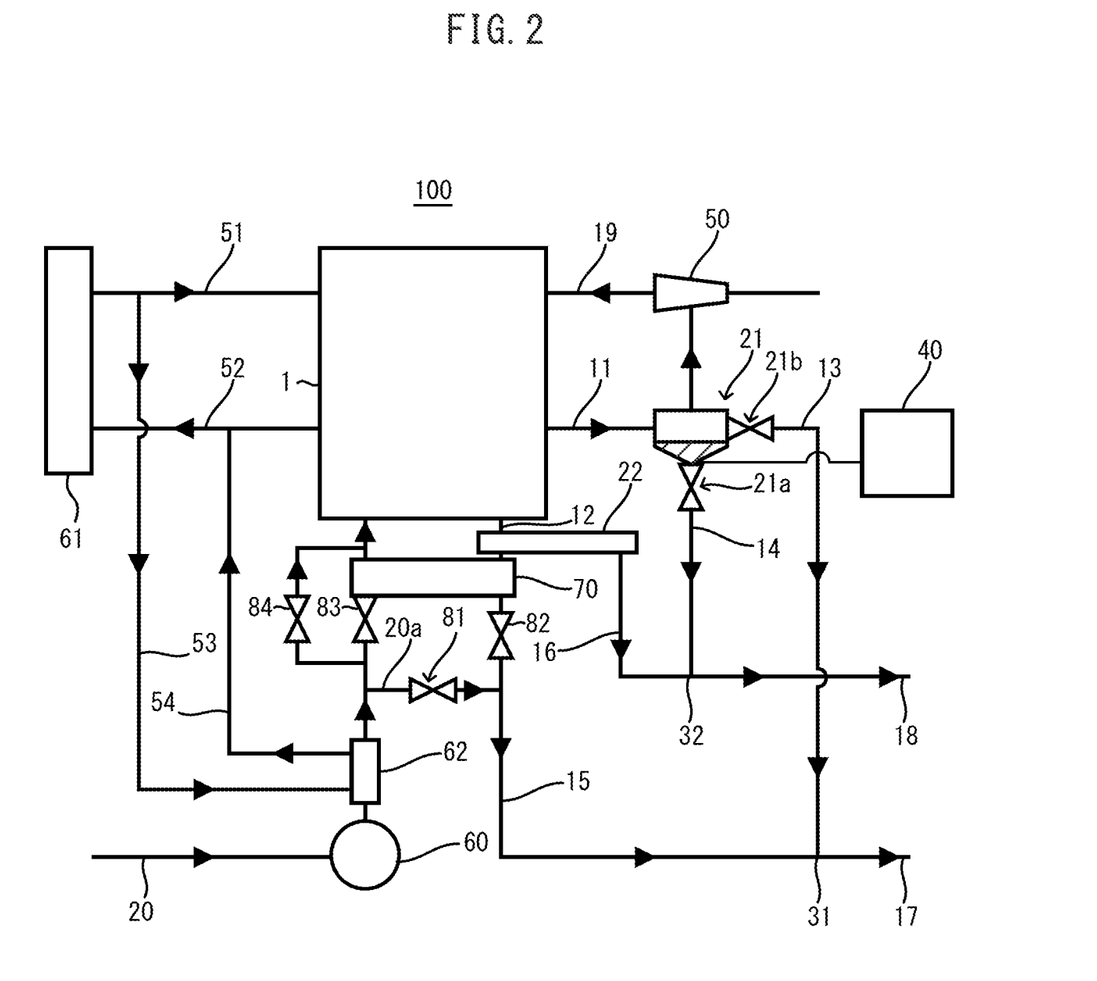
FIG. 2 is a schematic explanatory view of an example of other constituent components provided in the fuel cell system 100.

As stated above, the fuel cell 1 is supplied with anode gas to generate electricity. In other words, as shown in FIGS. 1 and 2, the fuel cell system 100 may comprise an anode gas supply passage 19 through which anode gas is externally supplied to the fuel cell 1. For example, the anode gas supply passage 19 may be connected at one end on the upstream side to an anode gas supply source and at the other end on the downstream side to an anode gas supply port of the fuel cell 1. The form of the anode gas supply source is not particularly limited. The anode gas supply source may be a tank containing fuel gas or a fuel gas storage alloy, etc. The anode gas supply passage 19 may be shaped in the same manner as conventional passages. Note that as shown in FIGS. 1 and 2, the anode gas supply passage 19 may be provided with various devices, such as an injector 50 and a circulation pump, etc.

1.13.2 Cathode Gas Supply Passage

As stated above, the fuel cell 1 is supplied with cathode gas to generate electricity. In other words, as shown in FIGS. 1 and 2, the fuel cell system 100 may comprise a cathode gas supply passage 20 through which cathode gas is externally supplied to the fuel cell 1. For example, the cathode gas supply passage 20 may be connected at one end on the upstream side to a cathode gas supply source and at the other end on the downstream side to a cathode gas supply port of the fuel cell 1. The form of the cathode gas supply source is not particularly limited. When air is used as the cathode gas, the cathode gas supply passage 20 may open into the atmosphere at the upstream end.

1.13.3 Bypass Passage

As can be seen in FIG. 2, the fuel cell system 100 may comprise a bypass passage 20*a* which is branched from the cathode gas supply passage 20 and which is connected to a cathode off-gas discharge passage (fifth flow passage 15). The bypass passage 20*a* may function as a discharge passage through which, for example, when the amount or pressure of the cathode gas in the passage 20 is excessive, the excessive cathode gas is discharged from the supply passage 20 into the fifth flow passage 15. Furthermore, when a compressor 60, which will be discussed hereinafter, is a turbo compressor (e.g., a centrifugal compressor), the bypass passage 20*a* may also have a function to avoid surging of the turbo compressor. In other words, when the amount of the cathode gas required by the fuel cell 1 is below the lower limit amount of the turbo compressor, it is possible to maintain the amount of cathode gas of the turbo compressor above the lower limit amount using the bypass passage 20*a*, in order to avoid the occurrence of surging. It is also possible to control the amount of cathode gas supplied to the fuel cell 1 by bifurcating a part of the cathode gas into the bypass passage 20*a*. In addition, the bypass passage 20*a* may have a function as a passage through which the cathode gas is discharged when it is necessary to restrict or interrupt the supply of the cathode gas to the fuel cell 1 for some reason. In the fuel cell system 100, as shown in FIG. 2, the amount of cathode gas in the bypass passage 20*a* may be regulated by a flow amount control valve 81.

1.13.4 Compressor

As shown in FIG. 2, the cathode gas supply passage 20 may comprise a compressor 60. The compressor 60 may be arranged on the upstream side from the bypass passage 20a. The compressor 60 has a function to increase the pressure of the cathode gas supplied to the fuel cell 1. The type of the compressor is not particularly limited. The compressor 60 may be of, for example, a turbo-type, a scroll-type, or a helical-roots type. Alternatively, a compressor 60 with an expander may be adopted and connected to the fifth flow passage 15. As stated above, in the fuel cell system 100 of the present disclosure, since the amount of water in the fifth flow passage 15 is reduced by separating the cathode off-gas into gas and liquid, it is possible to prevent the liquid (water) from flowing into the expander.

1.13.5 Coolant Passage and Heat Exchanger

As shown in FIG. 2, in the fuel cell system 100, coolant passages 51 and 52 may be provided to circulate coolant between the fuel cell 1 and the heat exchanger 61. The coolant passages 51 and 52 and the heat exchanger 61 may be conventionally used coolant passages and heat exchanger. For example, a radiator, an intercooler, an oil cooler, or a combination thereof can be used as the heat exchanger 61. Considering that the fuel cell system is mounted on a vehicle, a heat exchanger 61 including at least a radiator may be used.

1.13.6 Intercooler

As shown in FIG. 2, in the fuel cell system 100, an intercooler 62 may be provided on the downstream side from the compressor 60. In other words, the cathode gas, the temperature of which has increased due to an increase in pressure by the compressor 60, may be cooled by the intercooler 62 while maintaining a predetermined pressure. The intercooler 62 may be connected, for example, to the coolant passages 51 and 52. In other words, a part of the coolant which circulates in the coolant passages 51 and 52 is branched into the intercooler 62 through the flow passage 53, so that the necessary coolability of the intercooler 62 can be easily obtained. The coolant supplied to the intercooler 62 may be returned to the coolant passage 52 via a flow passage 54.

1.13.7 Humidifier

As shown in FIG. 2, in the fuel cell system 100, a humidifier 70 may be provided in the cathode gas supply passage 20. The humidifier 70 may be arranged between the fuel cell 1 and the bypass passage 20a. Furthermore, the humidifier 70 may be connected to both the cathode gas supply passage 20 and the cathode off-gas discharge passage (fifth flow passage 15). Specifically, the humidifier 70 may humidify the inside of the fuel cell 1 using the water contained in the cathode off-gas discharged into the fifth flow passage 15 from the fuel cell 1. In other words, in the fuel cell system 100, the water may be circulated through the fuel cell 1, the cathode gas supply passage 20, the fifth flow passage 15, and the humidifier 70.

1.13.8 Valve

Each of the flow passages may be provided with a valve other than the aforementioned valves. For example, as shown in FIG. 2, the fifth flow passage 15 may be provided with a valve 82 on the upstream side from the bypass passage 20a (between the fuel cell 1 and the bypass passage 20a). It is possible to control the flow amount or pressure of the cathode gas by controlling the opening degree of the valve 82. For example, if the internal pressure of the fuel cell 1 decreases, the opening degree of the valve 82 may be decreased and the internal pressure of the cathode gas supply passage 20 may be increased by the compressor 60.

As shown in FIG. 2, the cathode gas supply passage 20 may be provided with a valve 83 on the downstream side of the bypass passage 20a (between the fuel cell 1 and the bypass passage 20a). It is possible to control the flow amount or pressure of the cathode gas by controlling the opening degree of the valve 83. For example, if the amount of the cathode gas supplied to the fuel cell 1 is more than the necessary amount, the opening degree of the valve 83 may be decreased and the opening degree of the flow amount control valve 81 may be increased, whereby the amount of the cathode gas supplied to the fuel cell 1 may be reduced without changing the amount of cathode gas of the compressor 60.

As shown in FIG. 2, when the humidifier 70 is provided in the fuel cell system 100, the cathode gas supply passage 20 may be provided with a bypass passage which bypasses the humidifier 70. The bypass passage may be provided therein with a valve 84. In this case, as shown in FIG. 2, the valve 83 may be provided on the upstream side from the humidifier 70 (between the bypass passage and the humidifier 70). In other words, as shown in FIG. 2, if the inside of the fuel cell 1 is humidified by the humidifier 70, the opening degree of the valve 83 may be increased and the opening degree of the valve 84 may be decreased. If the humidification by the humidifier 70 is unnecessary, the opening degree of the valve 83 may be decreased and the opening degree of the valve 84 may be increased.

Note that, in the fuel cell system 100, the opening and closing operation of the aforementioned valves 81 to 84 may be controlled by the controller 40. In other words, the controller 40 may control at least the liquid surface level of the anode gas-liquid separator 21 during the discharging operation of the anode gas-liquid separator 21. In addition thereto, the controller 40 may control the amount of gas in each flow passage or the humidity of the fuel cell 1 or may further perform other control operations.

1.13.9 Others

The fuel cell system 100 may comprise other constituent components which are not illustrated. The fuel cell system 100 may comprise, for example, a cleaner which removes dust or foreign matter contained in the cathode gas prior to the introduction of the cathode gas into the compressor 60. Needless to say, wiring, etc., extending from the fuel cell 1 to the outside may be provided, which may be configured in the same manner as the prior art.

Note that, each of the constituent components illustrated in FIG. 2 is merely an example of the components which can be provided in the fuel cell system of the present disclosure. The fuel cell system of the present disclosure has the basic structure shown in FIG. 1 and may comprise only a part of the constituent elements or constituent elements other than those shown in FIG. 2.

2. Vehicle

Figure 3A:
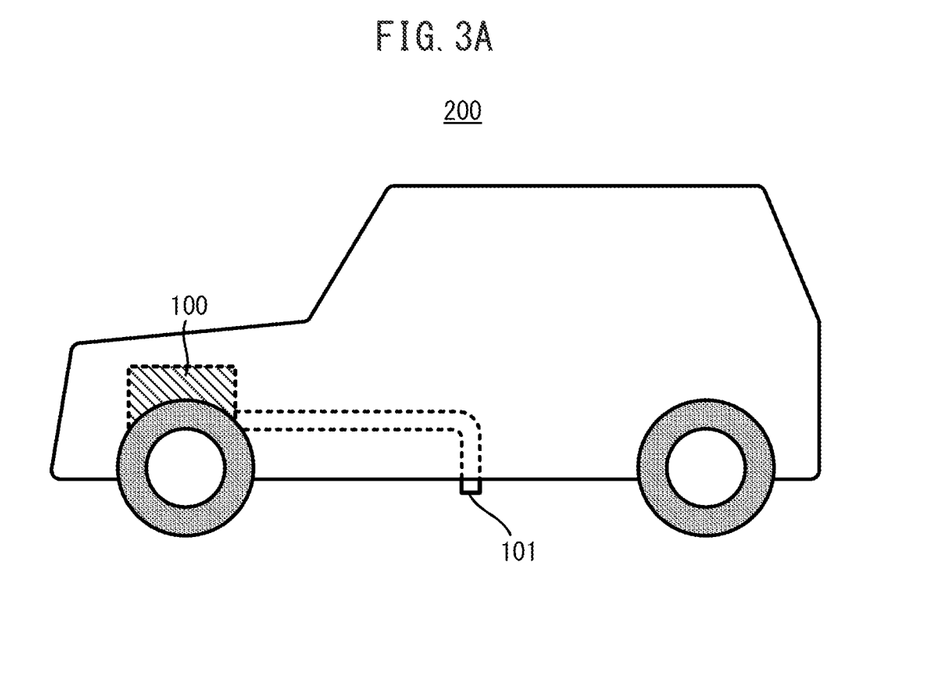
FIG. 3A is a schematic explanatory view of a vehicle 200 when viewed from the side.
Figure 3B:
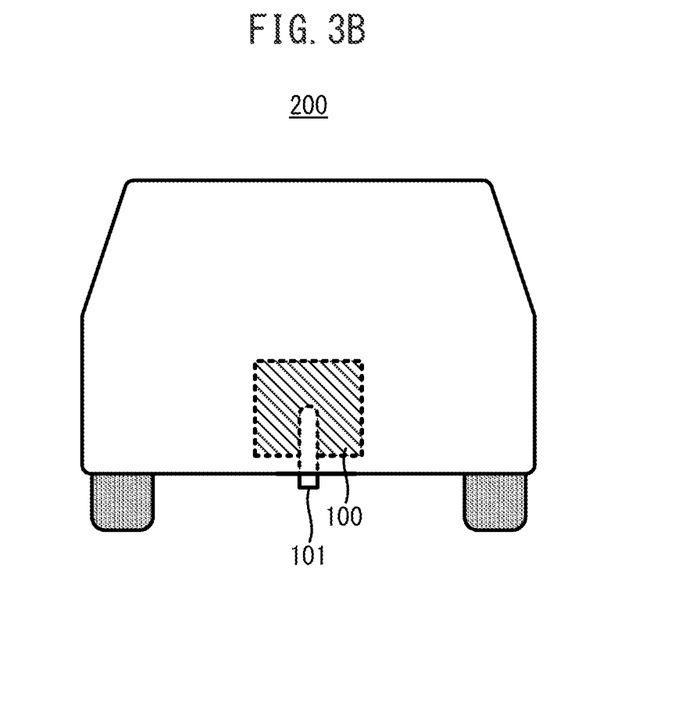
FIG. 3B is a schematic explanatory view of a vehicle 200 when viewed from the rear.

The technology of the present disclosure also includes an aspect of a vehicle. As shown in FIGS. 3A and 3B, the vehicle 200 of the present disclosure comprises the fuel cell system 100.

The mounting position of the fuel cell system 100 in the vehicle is not limited to a specific position. For example, as shown in FIG. 3A, the fuel cell system 100 may be mounted on the front portion of the vehicle 200. Alternatively, the fuel cell system 100 may be mounted on the intermediate portion of the vehicle in the forward and backward direction of the vehicle 200 or on the rear portion of the vehicle 200. Moreover, in the vehicle 200, the position of the outlet port of the drainage discharged from the fuel cell system 100 is not particularly limited. In particular, as shown in FIG. 3B, when the drain port 101 of the fuel cell system 100 is provided and oriented downward in the central portion in the width direction of the vehicle 200, it is possible to prevent the drainage from the fuel cell system 100 from contacting the vehicle wheels, and spraying of the drainage hardly occurs. Furthermore, it is also possible to prevent the drainage from being maintained in a rut in the road surface, whereby in cold districts, the occurrence of road surface freezing at the rut or skidding of the vehicle due to the frozen road surface can be suppressed. The drain port 101 may be provided, for example, at the downstream end of the aforementioned eighth flow passage 18.

In the vehicle 200, the position of the outlet port of the exhaust gas discharged from the fuel cell system 100 is not particularly limited. The outlet port may be located in a position where another vehicle, passersby and crew, etc., are less influenced. For example, the outlet port may be located in the central portion of the vehicle 200 in the forward and rearward direction and may be oriented downward. The outlet port may be located in the downstream end of the fifth flow passage 15. Note that, in the fuel cell system 100 of the present disclosure, since the exhaust system and the drainage system are separately provided, the problems of the white fog or water splashing due to the gas discharged from the exhaust system tend not to occur. Therefore, even if the outlet port of the exhaust gas is located in the rear portion of the vehicle, following vehicles are less influenced.

As can be seen from the foregoing, according to the fuel cell system 100 of the present disclosure, the gas (separated anode gas) contained in the anode off-gas can be mixed with the gas (separated cathode gas) contained in the cathode off-gas and can be discharged together to the outside of the system, and the liquid (separated anode liquid) contained in the anode off-gas can be mixed with the liquid (separated cathode liquid) contained in the cathode off-gas and can be discharged together to the outside of the system. Furthermore, it is possible to prevent the separated anode gas from entering the drainage system by controlling the liquid surface level of the anode gas-liquid separator 21. As may be understood from the foregoing, in the fuel cell system 100 of the present disclosure, since the exhaust system and the drainage system are separately provided, and the amount of water in the exhaust system can be reduced, white fog tends not to occur without the need to control the amount of exhaust gas, etc., in the exhaust system. In addition, since the amount of water in the exhaust system is reduced, water tends not to spray together with the exhaust gas, thus resulting in less occurrence of water splashing. Furthermore, in the fuel cell system 100 of the present disclosure, it is possible to dilute the fuel gas in the separated anode gas by mixing the separated anode gas with the separated cathode gas.

REFERENCE SIGNS LIST

1 Fuel cell
11 First flaw passage
12 Second flow passage
13 Third flow passage
14 Fourth flow passage
15 Fifth flow passage
16 Sixth flow passage
17 Seventh flow passage
18 Eighth flow passage
19 Anode gas supply passage
20 Cathode gas supply passage
20*a* Bypass passage
21 Anode gas-liquid separator
21*a* Drain valve
21*b* Exhaust valve
22 Cathode gas-liquid separator
31 First connection portion
32 Second connection portion
40 Controller
50 Injector
51, 52 Coolant passage
53, 54 Coolant branch passage
60 Compressor
61 Heat exchanger
62 Intercooler
70 Humidifier
81 Flow amount control valve
82, 83, 84 Valve
100 Fuel cell system
101 Drain port
200 Vehicle

The invention claimed is:

1. A fuel cell system comprising:
   a fuel cell;
   a first flow passage through which an anode off-gas is discharged from the fuel cell;
   a second flow passage through which a cathode off-gas is discharged from the fuel cell;
   an anode gas-liquid separator which is connected to the first flow passage and which separates the anode off-gas into a separated anode gas and a separated anode liquid;
   a cathode gas-liquid separator which is connected to the second flow passage and which separates the cathode off-gas into a separated cathode gas and a separated cathode liquid;
   a third flow passage through which the separated anode gas is discharged from the anode gas-liquid separator,
   a fourth flow passage through which the separated anode liquid is discharge from the anode gas-liquid separator,
   a fifth flow passage through which the separated cathode gas is discharged from the cathode gas-liquid separator;
   a sixth flow passage through which the separated cathode liquid is discharge from the cathode gas-liquid separator;
   a first connection portion where the third flow passage and the fifth flow passage are connected to each other and the separated anode gas and the separated cathode gas are mixed;
   a seventh flow passage through which the mixed separated anode gas and separated cathode gas are discharged from the first connection portion;
   a second connection portion where the fourth flow passage and the sixth flow passage are connected to each other and the separated anode liquid and the separated cathode liquid are mixed;
   an eighth flow passage through which the mixed separated anode liquid and separated cathode liquid are discharged from the second connection portion; and
   a controller which controls a liquid surface level of the anode gas-liquid separator, wherein
   the separated anode liquid is discharged from a lower portion of the anode gas-liquid separator, and
   the controller controls the liquid surface level of the anode gas-liquid separator so that the liquid surface level does not become zero when the separated anode liquid is discharged from the anode gas-liquid separator.

2. The fuel cell system according to claim 1, wherein the anode gas-liquid separator comprises a liquid surface level sensor.

3. The fuel cell system according to claim 1, wherein the anode off-gas contains hydrogen.

4. The fuel cell system according to claim 1, wherein the fuel cell is a polymer electrolyte fuel cell.

5. A vehicle comprising the fuel cell system according to claim 1.

6. The vehicle according to claim 5, wherein a drain port of the fuel cell system is oriented downward in a central portion of the vehicle in the width direction.

* * * * *